(No Model.)
W. F. DRAPER.
SPINDLE.
No. 515,733.  Patented Feb. 27, 1894.
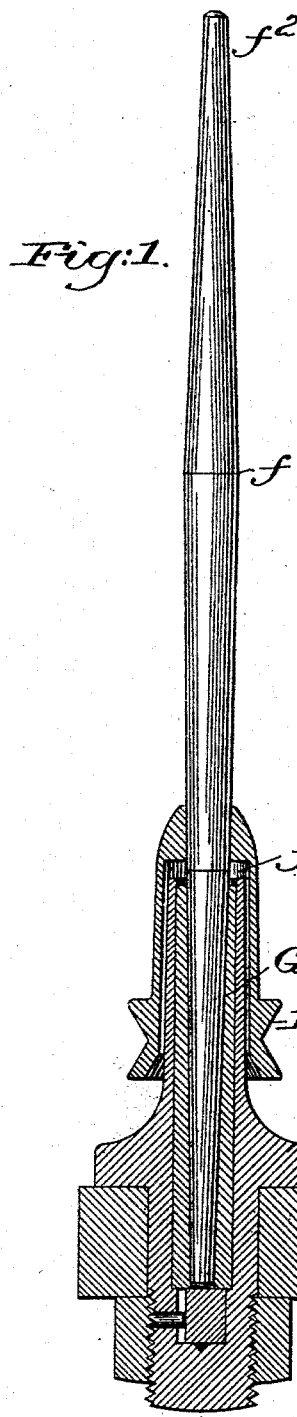
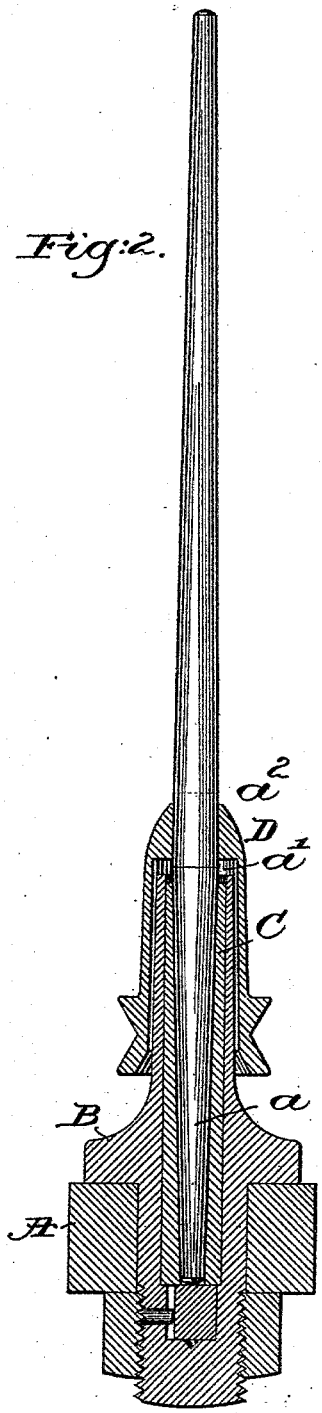
Witnesses.
Edward F. Allen.
Louis N. Gowell.
Inventor.
William F. Draper.
By Crosby & Gregory Attys.
THE NATIONAL LITHOGRAPHING COMPANY,
WASHINGTON, D. C.

UNITED STATES PATENT OFFICE.

WILLIAM F. DRAPER, OF HOPEDALE, MASSACHUSETTS.

SPINDLE.

SPECIFICATION forming part of Letters Patent No. 515,733, dated February 27, 1894.

Application filed June 19, 1893. Serial No. 478,042. (No model.)

*To all whom it may concern:*

Be it known that I, WILLIAM F. DRAPER, of Hopedale, county of Worcester, State of Massachusetts, have invented an Improvement in Spindles, of which the following description, in connection with the accompanying drawings, is a specification, like letters on the drawings representing like parts.

Sleeve whirl spindles as now commonly made have a tapered pintle and where the pintle commences the spindle is of greatest diameter, but above its said largest diameter the taper of the spindle is very slight toward the upper end, just enough to permit the smaller end of the sleeve whirl to be forced thereon into place, the largest diameter of the spindle being at a point quite close to the top of the whirl when in place, the spindle blade being gradually tapered from its said point of larger diameter to its upper end. I have discovered by experiment that the tendency of an unbalanced force or load carried by the spindle is to deflect the spindle between the upper end of the supporting-case and a point on the blade about or a little nearer the top of the supporting-case than midway the top of said case and the free end of the said blade.

To improve the spindle and materially lessen, if not actually prevent bending of the spindle, I have devised a spindle which is adapted to withstand all usual bending strains or strains due to an unbalanced load which would tend to bend the spindle out of true lines.

Figure 1 represents a spindle constructed in accordance with my invention, and Fig. 2, a spindle of usual construction.

Referring to Fig. 2, let A represent a rail; B a supporting-case; C a lateral bearing; and D a sleeve whirl spindle of usual construction, it having pintle $a$ tapered upwardly to the point $a'$ where the spindle is of greatest diameter. From the line $a'$ to the line $a^2$ the spindle is tapered slightly to provide a good surface onto which to force the sleeve, the latter being retained thereon by friction. The spindle blade from the line $a^2$ to the free end of the blade is tapered uniformly. In this old form of spindle strain upon the spindle and bobbin causes the spindle to be bent or deflected, the bend taking place between the top of the spindle and the upper end of the rigid part of the case.

I will now describe my improvement, referring to Fig. 1 wherein E represents the rail; F the usual supporting-case; G a lateral bearing tapered internally to fit the taper of the spindle; and H a sleeve whirl which is attached to the spindle. My improved spindle, however, differs materially from the old form of spindle represented in Fig. 2, in that it is made stronger and thicker at the point subjected to the greatest strains, as, for instance, my improved spindle has its maximum diameter at about midway the length of the blade, or at the point $f$, it tapering gradually from that point to the point $f'$, and from there down the taper forming the pintle may be more abrupt.

The spindle blade tapers from its nearly midway position at $f'$ gradually toward its upper end $f^2$.

Having described my invention, what I claim, and desire to secure by Letters Patent, is—

A sleeve whirl spindle tapered from its upper end downwardly, and from its lower end upwardly, the two tapers meeting at a point above the top of the whirl, thus making the spindle of greater diameter at a point above the whirl and between the latter and the upper end of the spindle, substantially as described.

In testimony whereof I have signed my name to this specification in the presence of two subscribing witnesses.

WILLIAM F. DRAPER.

Witnesses:
FRANK J. DUTCHER,
OLIVER H. LANE.